US011275537B2

(12) United States Patent
Kikuchi

(10) Patent No.: US 11,275,537 B2
(45) Date of Patent: Mar. 15, 2022

(54) INFORMATION PROCESSING APPARATUS, METHOD OF CONTROLLING THE SAME, AND STORAGE MEDIUM FOR DETERMINING AN ORDER FOR EXECUTION OF PRINT JOBS

(71) Applicant: CANON KABUSHIKI KAISHA, Tokyo (JP)

(72) Inventor: Shou Kikuchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/076,592

(22) Filed: Oct. 21, 2020

(65) Prior Publication Data
US 2021/0149609 A1 May 20, 2021

(30) Foreign Application Priority Data
Nov. 15, 2019 (JP) .............................. JP2019-207355

(51) Int. Cl.
*G06F 7/24* (2006.01)
*G06F 3/12* (2006.01)

(52) U.S. Cl.
CPC ............ *G06F 3/1215* (2013.01); *G06F 3/126* (2013.01); *G06F 3/1208* (2013.01)

(58) Field of Classification Search
CPC .... G06F 3/1215; G06F 3/1263; G06F 3/1208; G06F 3/1207; G06F 3/126
USPC ......... 358/1.15, 1.9, 1.2, 403; 707/608, 748, 707/752
See application file for complete search history.

(56) References Cited

U.S. PATENT DOCUMENTS

| 5,436,730 A | * | 7/1995 | Hube | .................... G06F 3/1297 358/1.16 |
| 2005/0243365 A1 | * | 11/2005 | Noda | .................... G06F 3/1288 358/1.15 |
| 2005/0275863 A1 | * | 12/2005 | Ota | ........................ G06F 3/126 358/1.13 |

FOREIGN PATENT DOCUMENTS

JP 2011-213098 A 10/2011

OTHER PUBLICATIONS

Dianne Kennedy, Idealliance, "Print Quality exchange (PQX) Specification", p. 5; Jun. 22, 2016 (Year: 2016).*

* cited by examiner

*Primary Examiner* — Jamares Q Washington
(74) *Attorney, Agent, or Firm* — Canon U.S.A., Inc. IP Division

(57) ABSTRACT

An information processing apparatus and a method of controlling the information processing apparatus are provided. The information processing apparatus receives print data including quality requirement data, generates a print job including instruction information for instructing at least one of a quality check and an adjustment operation for satisfying a quality requirement requested in the quality requirement data, sets an execution order of generated print jobs in order of the highest quality requirement down, and controls, in accordance with the set execution order, an execution order of print jobs to be performed in a production system and of checking jobs for checking whether products of the print jobs satisfy a required quality.

11 Claims, 11 Drawing Sheets

FIG. 6A

```xml
<PRX>
    <EvaluationInfo>
        </BasisofCalculation>ColorScore + RegistrationScore </BasisofCalculation>
    </EvaluationInfo>
    <QualitySpecification>
        <QualityGoals>
            <Color>
            <ComplianceGoal>JapanColor dE (CIE DE2000)</ComplianceGoal>
            <MinimumAcceptableRank>5</MinimumAcceptableRank>
            <ColorScoringScale>
                    <ParameterScore Rank="7">
                            <ValueRange> dE <= 2 </ValueRange>
                    </ParameterScore>
                    <ParameterScore Rank="6">
                            <ValueRange> 2 < dE <= 3 </ValueRange>
                    </ParameterScore>
                    <ParameterScore Rank="5">
                            <ValueRange> 3 < dE <= 5</ValueRange>
                    </ParameterScore>
            </ColorScoringScale>
            </Color>
            <Registration>
                    <MinimumAcceptableRank>6</MinimumAcceptableRank>
                    <RegistrationScoringScale>
                            <ParameterScore Rank="8">
                                    <ValueRange> diff <= 1mm </ValueRange>
                            </ParameterScore>
                            <ParameterScore Rank="7">
                                    <ValueRange> 1mm < diff <= 2mm <ValueRange>
                            </ParameterScore>
                            <ParameterScore Rank="6">
                                    <ValueRange> 2mm < diff <= 4mm </ValueRange>
                            </ParameterScore>
                    </RegistrationScoringScale>
            </Registration>
        </QualityGoals>
    </QualitySpecification>
</PRX>
```

```xml
<PRX>
    <EvaluationInfo>
        </BasisofCalculation>ColorScore + RegistrationScore </BasisofCalculation>
    </EvaluationInfo>
    <QualitySpecification>
        <QualityGoals>
            <Color>
            <ComplianceGoal>JapanColor dE (CIE DE2000)</ComplianceGoal>
            <MinimumAcceptableRank>6</MinimumAcceptableRank>
            <ColorScoringScale>
                    <ParameterScore Rank="7">
                            <ValueRange> dE <= 2 </ValueRange>
                    </ParameterScore>
                    <ParameterScore Rank="6">
                            <ValueRange> 2 < dE <= 3 </ValueRange>
                    </ParameterScore>
                    <ParameterScore Rank="5">
                            <ValueRange> 3 < dE <= 5</ValueRange>
                    </ParameterScore>
            </ColorScoringScale>
            </Color>
            <Registration>
                    <MinimumAcceptableRank>7</MinimumAcceptableRank>
                    <RegistrationScoringScale>
                            <ParameterScore Rank="8">
                                    <ValueRange> diff <= 1mm </ValueRange>
                            </ParameterScore>
                            <ParameterScore Rank="7">
                                    <ValueRange> 1mm < diff <= 2mm <ValueRange>
                            </ParameterScore>
                            <ParameterScore Rank="6">
                                    <ValueRange> 2mm < diff <= 4mm </ValueRange>
                            </ParameterScore>
                    </RegistrationScoringScale>
            </Registration>
        </QualityGoals>
    </QualitySpecification>
</PRX>
```

```xml
<PRX>
    <EvaluationInfo>
        </BasisofCalculation>ColorScore + RegistrationScore </BasisofCalculation>
    </EvaluationInfo>
    <QualitySpecification>
        <QualityGoals>
            <Color>
            <ComplianceGoal>JapanColor dE (CIE DE2000)</ComplianceGoal>
            <MinimumAcceptableRank>7</MinimumAcceptableRank>
            <ColorScoringScale>
                    <ParameterScore Rank="7">
                            <ValueRange> dE <= 2 </ValueRange>
                    </ParameterScore>
                    <ParameterScore Rank="6">
                            <ValueRange> 2 < dE <= 3 </ValueRange>
                    </ParameterScore>
                    <ParameterScore Rank="5">
                            <ValueRange> 3 < dE <= 5</ValueRange>
                    </ParameterScore>
            </ColorScoringScale>
            </Color>
            <Registration>
                    <MinimumAcceptableRank>8</MinimumAcceptableRank>
                    <RegistrationScoringScale>
                            <ParameterScore Rank="8">
                                    <ValueRange> diff <= 1mm </ValueRange>
                            </ParameterScore>
                            <ParameterScore Rank="7">
                                    <ValueRange> 1mm < diff <= 2mm <ValueRange>
                            </ParameterScore>
                            <ParameterScore Rank="6">
                                    <ValueRange> 2mm < diff <= 4mm </ValueRange>
                            </ParameterScore>
                    </RegistrationScoringScale>
            </Registration>
        </QualityGoals>
    </QualitySpecification>
</PRX>
```

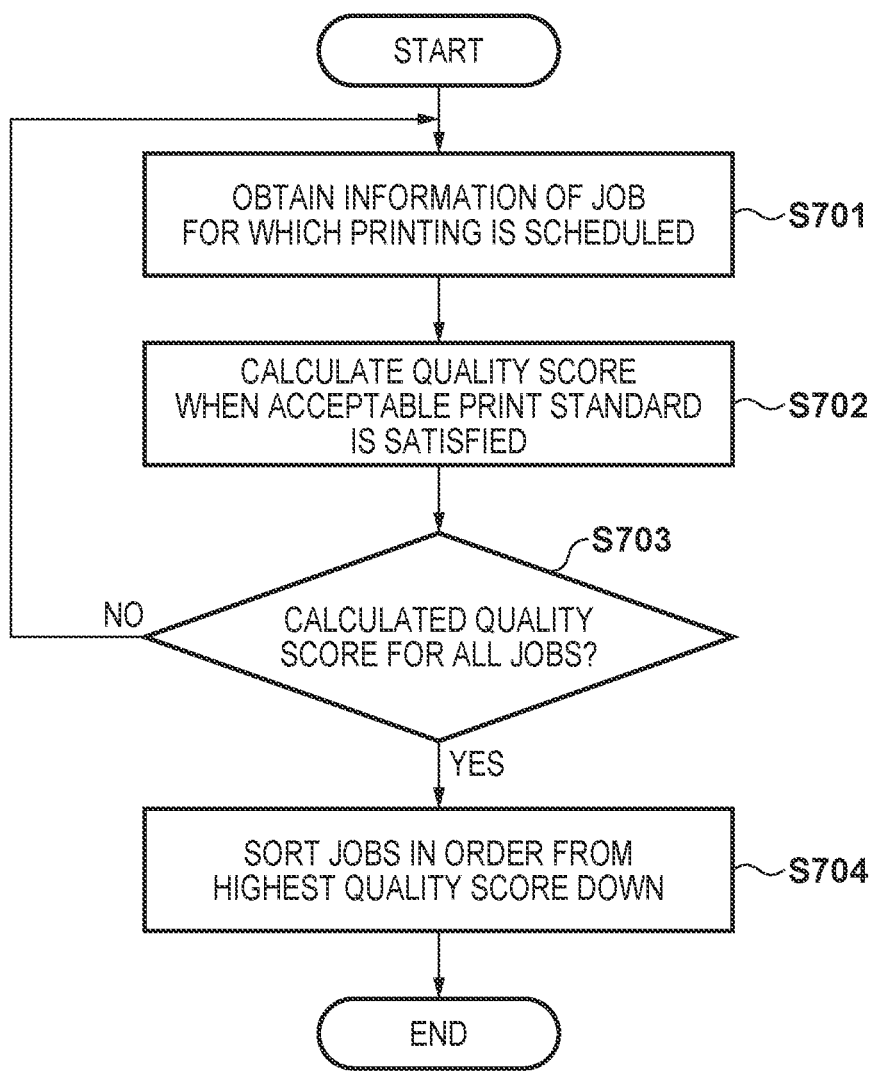

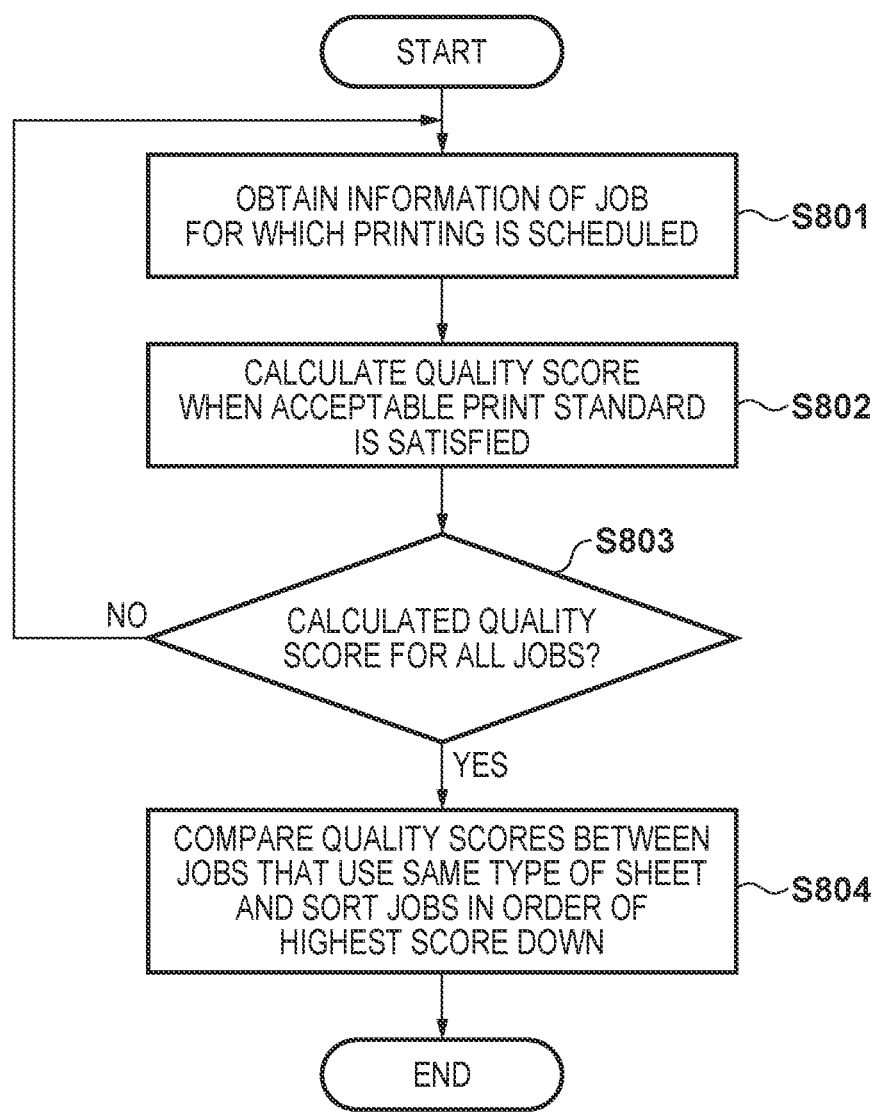

INFORMATION PROCESSING APPARATUS, METHOD OF CONTROLLING THE SAME, AND STORAGE MEDIUM FOR DETERMINING AN ORDER FOR EXECUTION OF PRINT JOBS

BACKGROUND

Field of the Disclosure

The present disclosure relates to an information processing apparatus, a method of controlling the same, and a storage medium.

Description of the Related Art

There are print service forms called print on demand (POD), production printing, and commercial printing. In such print service forms, there is a customer (also called an end user) who orders/requests printing and a printing company which supplies a printing result; the customer orders a print product by providing the printing company with a specification of the printing result and, if necessary, image data to be used for the printing. The "specification of the printing result" means elements that decide the content of the printing result, such as the type of sheet to use, finishing settings such as book binding or stapling, the number of sheets or copies to be printed, and the like, for example. In this way, the printing company that received a request uses the requested content and image data to create a printing result, then delivers the printing result to the customer.

In these commercial printing services, the printing company uses various devices and software in everything from receiving orders to delivering a printing result. For example, a printing apparatus for printing on a sheet, a finisher for binding/stapling, a verification apparatus for inspecting/verifying print products, and the like are used. In addition, a Web server for receiving orders for printing results from customers and terminals and software for managing the production of the printing results are also used. Also, there are a plurality of users of these devices and software. For example, these users include a person in charge of orders who manages orders and get in contact with customers, a process designer who designs the operation process by which the printing result is completed, an operator who operates a printing apparatus and a verification apparatus, and a checker who checks the quality of the final printing result. Furthermore, there may also be a printing company having a plurality of manufacturing locations; in such a case, the printing company decides which manufacturing locations should manufacture the printing results based on the content of the received orders.

In a commercial printing service, a quality requirement for a printing result is often specified by a customer to a printing company. This quality requirement is different from the specification for the printing result in that it indicates a requirement concerning the quality of the printing result such as a position deviation amount between the images on the front and back of the sheet or an amount of variation in a color value of images among a plurality of copies or a plurality of pages. There are various kinds of printing results, such as distribution items like flyers and pamphlets, photo albums and books, business cards, and exhibition panels, and their uses and prices also vary. For this reason, there is also a wide variety of quality requirements, depending on the required conditions and standards.

As described later, because an operation process for satisfying those quality requirements and a process for checking the quality of printing results at the printing company are required, generally, the higher the quality requirements standard, the higher the cost of printing results. Printing companies generate printing results by performing various adjustment operations to satisfy these quality requirements. For example, various adjustments are made on a printing apparatus for matching a specific color on a specific sheet and printing results that do not meet the quality requirements are removed as defective products in the post-print verification based on a sample printing result for which a customer's agreement has been obtained. The printing companies, through such operations, check whether or not the quality of a printing result that was achieved satisfies the quality requirements that the customers requested, and if necessary, submit a quality report to the customers.

Particularly, when receiving orders for printing results with various specifications and quality requirements from many customers, various kinds of operations will be required to satisfy the quality requirements of the customers for each printing result, which will take a long time. For example, assume that, as quality requirements, a printing result A is required to have no print misalignment between the front and back sides of a sheet, and a printing result B is required to have consistency with a color sample provided by a customer. In such a case, it is necessary for the person in charge of orders to inform the process designer of the quality requirements of each printing result using a data format used by the printing company. By this, the process designer, based on the types and states of printing apparatuses and software that can be used in the printing company, decides an operation process for satisfying the quality requirements in the production of each printing result.

For example, operations are decided so that, for the printing result A, a device of a post-processing apparatus is adjusted and for the printing result B, a color calibration is performed on a printing apparatus, and additionally, result checking operations for each operation such as a post-color calibration colorimetric operation are decided. Also, a method for checking the quality, which indicates how to check whether the produced printing results satisfy the quality requirements, is decided, such as a location at which to check print misalignment between the front and back sides of a sheet and a maximum value of an acceptable misalignment amount.

Generally, a plurality of printing apparatuses are used at a printing company, so a process designer needs to choose the most appropriate printing apparatus from among the plurality of printing apparatuses in order to satisfy the quality requirements for a printing result for which the order was received. As described above, it is necessary to define a workflow for performing both the production of a printing result that satisfies the quality requirements and a quality check of the produced printing result in a printing company. An operator receives an operation process decided in this way, and then accordingly operates the printing apparatus and the software. A checker checks whether or not the printing result satisfies the quality requirements based on the produced printing result and a means for checking the quality. As described above, a printing company spends many man-hours on operations for deciding the quality requirements, the operation process for satisfying these requirements, and transmitting a quality report indicating the quality of checked printing results.

Conventionally, a unified data format had not been defined or used for when customers and printing companies send and receive quality requirements and quality reports. Thus, the printing companies would receive the quality requirements in different data formats from different customers, and inconvenience would arise when operation processes were being designed based on the quality requirements in order to satisfy those requirements. Even from the perspective of the customer, it was cumbersome to send and receive quality requirements and quality reports in different data formats when placing orders for printing results to a plurality of printing companies.

Accordingly, PRX and PQX are being provided as standardization techniques for unifying a data format for transmitting quality requirements and quality reports. PRX stands for Print Requirement eXchange format and indicates a standardized data format for quality requirements required for printing. By using PRX, the quality requirements for different customers or different orders can be written in a unified data format. PQX stands for Print Quality eXchange format and indicates a standardized data format for print quality reports. PQX allows the quality data of printing results to be transmitted in a standardized data format. As described above, by using PRX and PQX, it becomes possible to transmit quality requirements and quality reports that have not been unified in the past in a unified data format.

Also, a technique is described in Japanese Patent Laid-Open No. 2011-213098 as a technique for minimizing downtime when executing a plurality of print jobs. In Japanese Patent Laid-Open No. 2011-213098, a time period required to decode a print job targeted for printing is predicted from a time period required to encode the print job, and a printing speed level is decided for each print job. Also, it describes a technique in which the order of print jobs is switched so that the switching of the printing speed becomes minimal, because when such a printing speed is switched frequently, downtime occurs due to the time it takes to perform such switching.

There are quality requirements for various printing results as described above depending on the customer or the printing result; for example, assume that, as a quality requirement, a customer demands that printing is performed in accordance with color reproducibility and stability complying with a JapanColor standard. Color reproducibility is a measure indicating whether colors expressed in definitions such as RGB or CMYK in print data provided by the customer are printed in the same color on the printing result. Stability is a measure indicating whether the color of the printing results does not change for print data of the same color when printing a plurality of pages or copies. The customer often requires, as a quality requirement that the print data is to be printed in the same color as provided print data and that the result should not change on any page.

Meanwhile, the operation process for satisfying the quality requirement depends on the presence or absence of a printing apparatus suitable for fulfilling the quality requirements from the customer, and the print data and the specifications of the printing results provided by the customer. Further, regarding the color stability, the frequency that color calibration of the printing apparatus and sample printing are performed, as operation processes, changes depending on the type of sheet specified in the specification, and the printing apparatus or ink used. As described above, the operation process for satisfying the quality requirements requested by the customer varies depending on the printing result specifications and the quality requirements requested by the customer.

By using the PRX as described above, it becomes possible to input quality requirements for the printing result ordered by customers in a digital format for every print job order. Also, by using PQX, a quality report can be written in a digital format for every print job. Accordingly, a print system that can perform quality management in which, for each print job, the PRX is interpreted and a printing apparatus needed to satisfy quality requirements is adjusted, and a required-quality-checking job is generated to check whether the quality requirements are satisfied, is required.

For this reason, when checking whether every print job satisfies quality requirements, it is necessary to, for every print job, generate a checking job for checking quality and check the quality conditions, and adjust the printing apparatus. There is an issue in that, if, in such a situation, the number of print jobs becomes large, the downtime of the printing apparatus becomes long due to the operation for checking, for each print job, whether the quality requirements are satisfied, and the adjustment operations.

SUMMARY

Embodiments of the present disclosure eliminate the above-mentioned issue with conventional technology.

Embodiments of the present disclosure provide a technique that, based on quality requirements requested by a user, changes a job execution order so that jobs of a high requested quality be executed first, and thereby reduces downtime that occurs due to adjustment.

Some embodiments of the present disclosure provide an information processing apparatus comprising: at least one processor and at least one memory configured to perform: receiving print data including quality requirement data; generating a print job including instruction information for instructing at least one of a quality check and an adjustment operation for satisfying a quality requirement requested in the quality requirement data; setting an execution order of generated print jobs in order of the highest quality requirement down; and controlling, in accordance with the set execution order, an execution order of print jobs to be performed in a production system and of checking jobs for checking whether or not products of the print jobs satisfy a required quality.

Some embodiments of the present disclosure provide a method of controlling an information processing apparatus, the method comprising: receiving print data including quality requirement data; generating a print job including instruction information for instructing at least one of a quality check and an adjustment operation for satisfying a quality requirement requested in the quality requirement data; setting an execution order of generated print jobs in order of the highest quality requirement down; and controlling, in accordance with the set execution order, an execution order of print jobs to be performed in a production system and of checking jobs for checking whether products of the print jobs satisfy a required quality.

Some embodiments of the present disclosure provide a non-transitory computer-readable storage medium storing a program for causing a processor to execute a method of controlling an information processing apparatus, the method comprising: receiving print data including quality requirement data; generating a print job including instruction information for instructing at least one of a quality check and an adjustment operation for satisfying a quality requirement requested in the quality requirement data; setting an execution order of generated print jobs in order of the highest quality requirement down; and controlling, in accordance with the set execution order, an execution order of print jobs to be performed in a production system and of checking jobs for checking whether products of the print jobs satisfy a required quality.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIGS. 6A-6C depict views respectively illustrating concrete examples of PRX data according to embodiments.

FIG. 7 is a flowchart for describing a flow of a process by the workflow management server according to a first embodiment.

FIG. 8 is a flowchart for describing a flow of a process by the workflow management server according to a second embodiment.

DESCRIPTION OF THE EMBODIMENTS

Embodiments of the present disclosure will be described hereinafter in detail, with reference to the accompanying drawings. It is to be understood that the following embodiments are not intended to limit the claims, and that not all of the combinations of the aspects that are described according to the following embodiments are necessarily required. Note, in the embodiments described below, one example of an information processing apparatus according to the present disclosure is described using an image forming apparatus such as a multi-function peripheral as an example, but the present disclosure is not limited to such an image forming apparatus.

Figure 1:
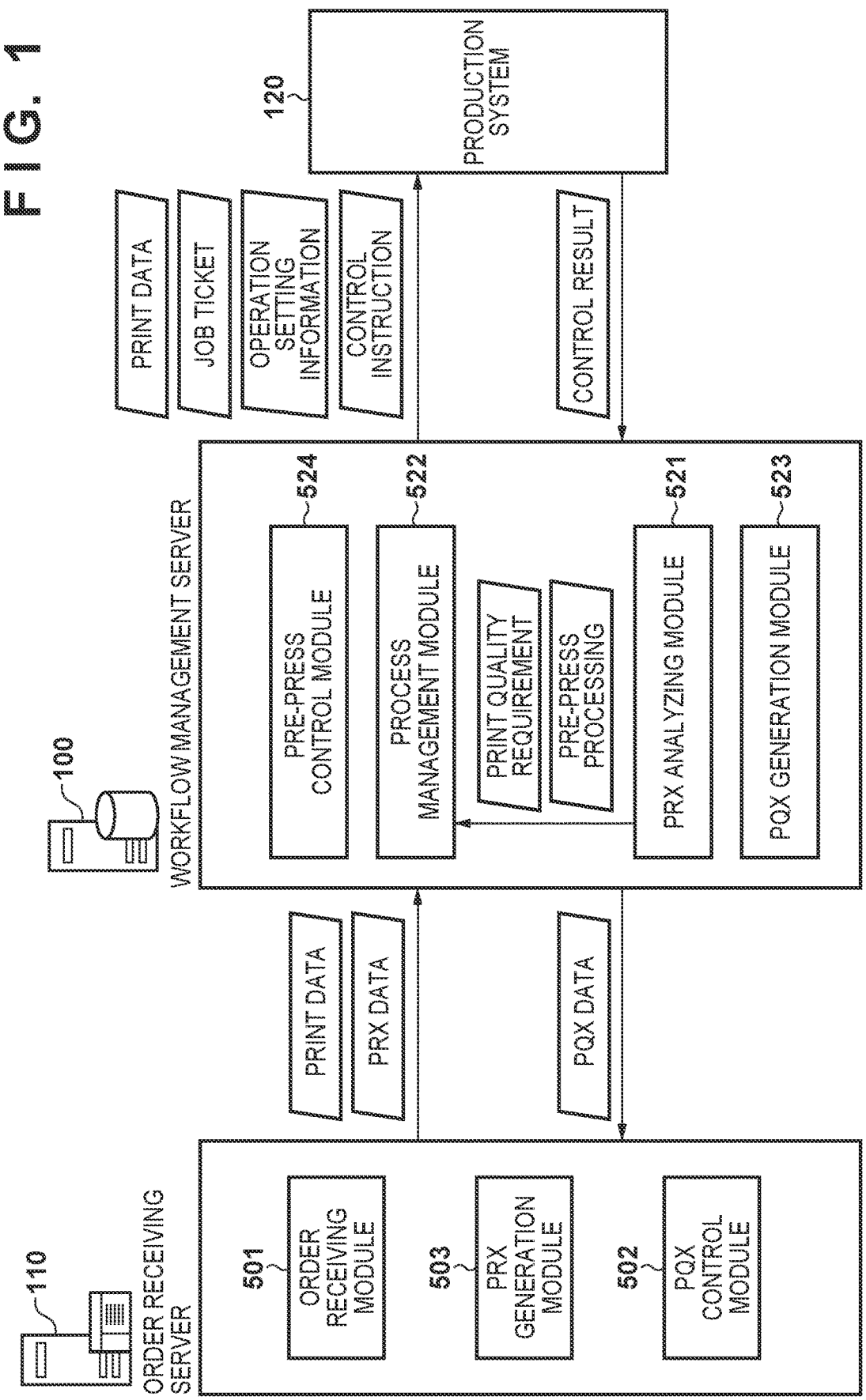
FIG. 1 depicts a schematic view for describing a print system according to embodiments of the present disclosure.

FIG. 1 depicts a schematic view for describing a print system according to embodiments of the present disclosure.

Details of the roles of each apparatus and the operation of the print system are described later with reference to FIG. 2 onward.

A feature of the embodiment is that PRX data (quality requirement data) that an order receiving server 110 generates is analyzed by a PRX analyzing module 521 of a workflow management server 100 which is one example of an information processing apparatus according to the present disclosure, and print data, job tickets, operation setting information, and control instructions that are based on the results of such analysis are transmitted to a production system 120.

Figure 2:
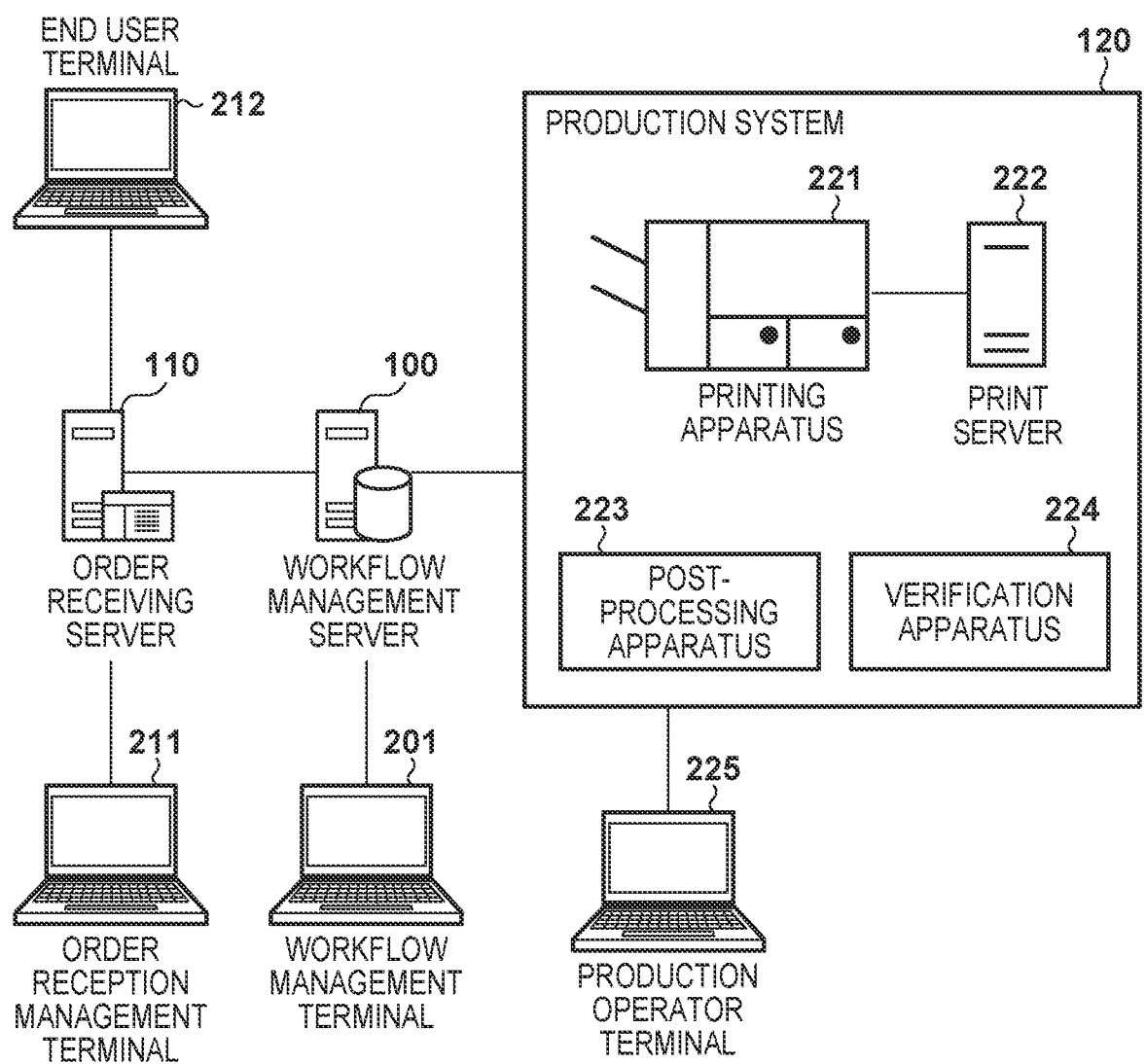
FIG. 2 depicts a view for describing a configuration of a commercial print system according to embodiments.

FIG. 2 depicts a view for describing a configuration of a commercial print system according to embodiments.

The workflow management server 100 manages a workflow as a whole regarding a commercial printing product. The workflow management server 100 receives PRX data, which is print data or quality requirement data, from the order receiving server 110. Then, the workflow management server 100 interprets the received PRX data, and for each job for which an order is received, decides the production system 120, and executes print data pre-press processing. Also, the workflow management server 100 generates data (print data, a job ticket, operation setting information of such as a checking job, and a control instruction as shown in FIG. 1) which is a processing target of the production system 120 and transmits the data to each device (such as a printing apparatus 221, a post-processing apparatus 223, and a verification apparatus 224, for example) configuring the production system 120. The devices configuring the production system 120 are described later with reference to FIG. 2. Furthermore, the workflow management server 100 generates PQX data (quality report data) based on information (in a control result of FIG. 1, information including checking information such as whether a requested quality has been achieved) obtained from each device configuring the production system 120 and transmits this PQX data to the order receiving server 110.

Note that, although the workflow management server 100 is described in the embodiment as an on-premises server installed at a location where workflow management is performed, the present disclosure is not limited to this. For example, as another embodiment, configuration may be taken such that the workflow management server 100 is configured as a cloud server and is connected via the Internet from a workflow management terminal 201 described later. The same applies to the order receiving server 110 described later.

The workflow management terminal 201 is a terminal operated by a workflow administrator, and the workflow management terminal 201 connects to the workflow management server 100 via the network and executes various functions. Specifically, the workflow management terminal 201 performs changes of settings of a workflow management function, a check of the status of devices of the production system 120, and the like.

The order receiving server 110 is an apparatus that manages a system for receiving an order from an end user regarding a commercial printing product. Depending on an ordered product and the contents of the order from an end user, print data and PRX data are generated and transmitted them to the workflow management server 100. An order reception management terminal 211 is a terminal operated by a manager of an order reception system, and the order reception management terminal 211 is connected to the order receiving server 110 via a network, and executes various functions. Specific examples of these functions include functions such as a requested quality setting for each product, a status check for each received-order job, and browsing of quality information of a result for each received-order job.

An end user terminal 212 is a terminal operated by an end user, and is connected to the order receiving server 110 via the network. Also, from a UI such as a Web browser, instructions such as product selection, transmission of original data, and order placement are accepted from the end user and are transmitted to the order receiving server 110.

The production system 120 is a system for producing a commercial printing product (result) ordered by an end user. In detail, the production system 120 includes apparatuses such as the printing apparatus 221, a print server 222 for controlling the printing apparatus 221, a post-processing apparatus 223, and the verification apparatus 224. Here, the printing apparatus 221 and the print server 222 are connected via a network or a dedicated interface.

In the embodiment, the post-processing apparatus 223 and the verification apparatus 224 are described as a nearline configuration in which they are connected to other devices via a network. However, the present disclosure is not limited to this and an offline configuration in which the post-processing apparatus 223 and the verification apparatus 224 run independently is also possible. In the case of the offline configuration, the post-processing apparatus 223 and the verification apparatus 224 connect to an operation terminal (not shown) which can be connected with a network, and connect with the network via the operation terminal. In any case, the post-processing apparatus 223 and the verification apparatus 224 connect to the workflow management server 100 via the network, and transmit and receive various information. Note that there are also cases in which the production system 120 is configured such that it does not include either the print server 222, the post-processing apparatus 223, or the verification apparatus 224, or any of these.

The printing apparatus 221 executes a printing process based on data and instructions from the workflow management server 100. Here, the print method is not particularly limited, and may be either an electrographic method, an inkjet method, or another method. The manager or the operator of the production system 120 can instruct a control relating to printing via the UI of the printing apparatus 221. The print server 222 is a server for controlling the printing apparatus 221. Similar to a general print system, the manager or the operator of the production system 120 can instruct a control relating to printing to the printing apparatus 221 via a UI of the print server 222.

Note, in the embodiment, although a color management module 545 (FIG. 5) (described later) of the production system 120 is described as being included in the print server 222, the present disclosure is not limited to this. For example, there may be a form in which a color management server (not shown) that can be connected to the print server 222 and the printing apparatus 221 via the network is separately installed, and the color management server may perform the process related to color management.

The post-processing apparatus 223 performs post-processing for printed sheets and sheet bundles. Post-processing includes, for example, creasing and folding a sheet, trimming and binding processing on a sheet bundle, and the like. The verification apparatus 224 detects a malfunction for a final product or an intermediate product, and makes a notification to the user or executes processing such as removal of the result from the manufacturing line. A production operator terminal 225 is an apparatus used by an operator who operates various devices of the production system 120 described above, and includes functions such as checking an operation state of each device and checking error information when an abnormality occurs. As another form, a UI operation unit included in each device of the production system 120 may be configured to handle these functions instead of an external terminal.

Next, a hardware configuration of each apparatus according to the embodiments is described.

Figure 3:
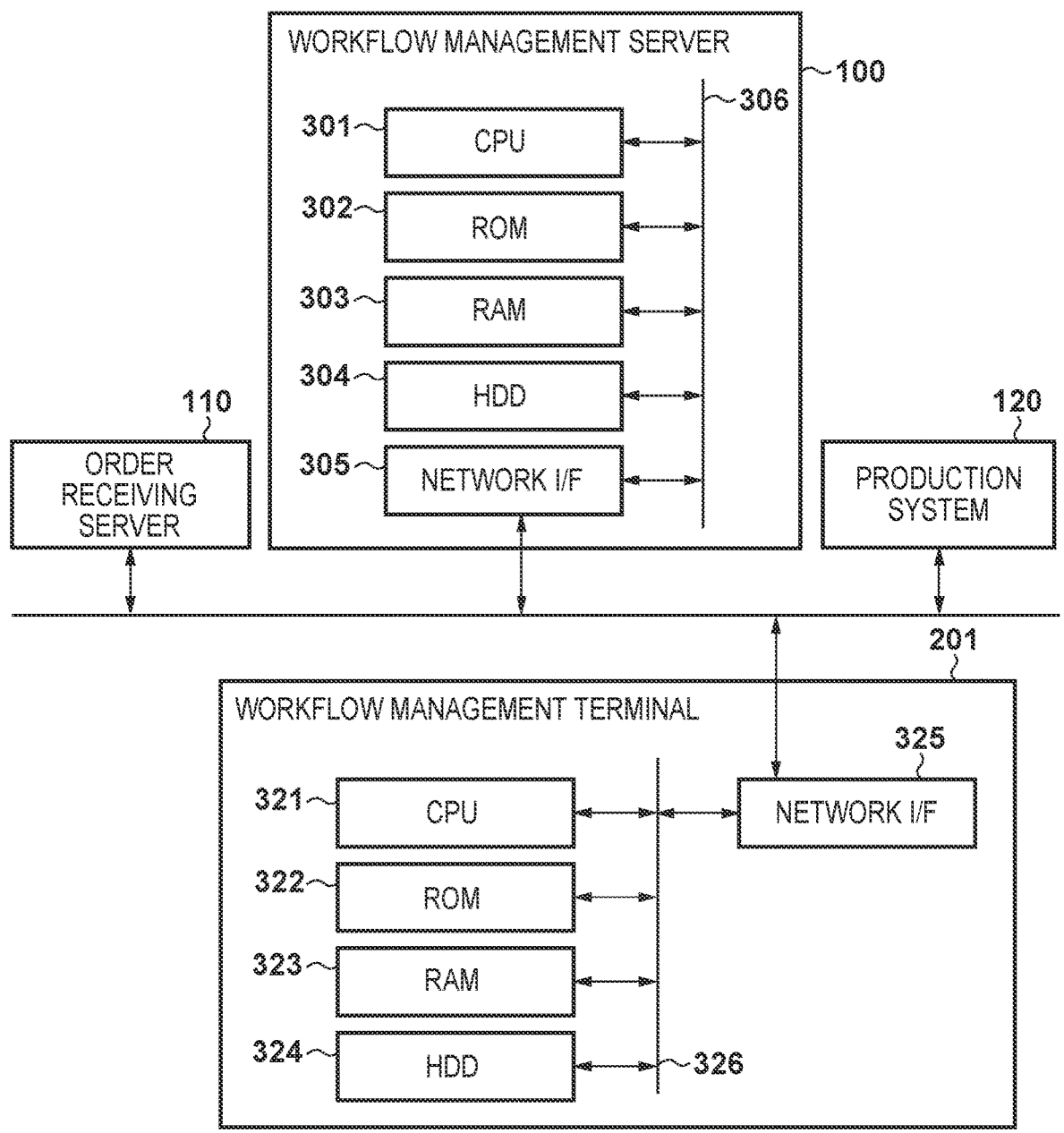
FIG. 3 is a block diagram for describing a hardware configuration of a workflow management system including a workflow management server and a workflow management terminal according to embodiments.

FIG. 3 is a block diagram for describing a hardware configuration of a workflow management system including the workflow management server 100 and the workflow management terminal 201 according to embodiments.

Firstly, a hardware configuration of the workflow management server 100 is described.

A CPU 301 of the workflow management server 100 deploys a control program stored in a ROM 302 or a hard disk (HDD) 304 into a RAM 303, executes the deployed program, and comprehensively controls access for various devices connected a system bus 306. The ROM 302 stores control programs and the like which the CPU 301 can execute. The RAM 303 is configured to mainly function as the main memory, work area, and the like of the CPU 301, and can have its memory capacity extended by an optional RAM connected to an expansion port (not shown). The hard disk (HDD) 304 stores boot programs, various applications, font data, user files, edit files, and the like. Note that, although an HDD 304 is used in this embodiment, an SD card, flash memory, or the like other than an HDD may be used as an external storage unit. The same also applies to apparatuses having an HDD described hereinafter. A network I/F 305 performs data communication with various apparatuses via the network. Note that, in the case of the order receiving server 110, because its hardware configuration is the same as the workflow management server 100, description thereof is omitted.

Next, hardware configuration of the workflow management terminal 201 is described.

A CPU 321 of the workflow management terminal 201 deploys a control program stored in a ROM 322 or a hard disk (HDD) 324 into a RAM 323, executes the deployed program, and comprehensively controls access of various devices connected to a system bus 326. The ROM 322 stores control programs and the like which are executed by the CPU 321. The RAM 323 is configured to mainly function as the main memory, work area, and the like of the CPU 321, and can have its memory capacity extended by an optional RAM connected to an expansion port (not shown). The hard disk (HDD) 324 stores a boot program, various applications, font data, user files, edit files, and the like. A network I/F 325 performs data communication with other apparatuses via a network. Note that because other terminal apparatuses such as the order reception management terminal 211, the end user terminal 212, and the production operator terminal 225 have the same hardware configuration as the workflow management terminal 201, description thereof is omitted.

Figure 4:
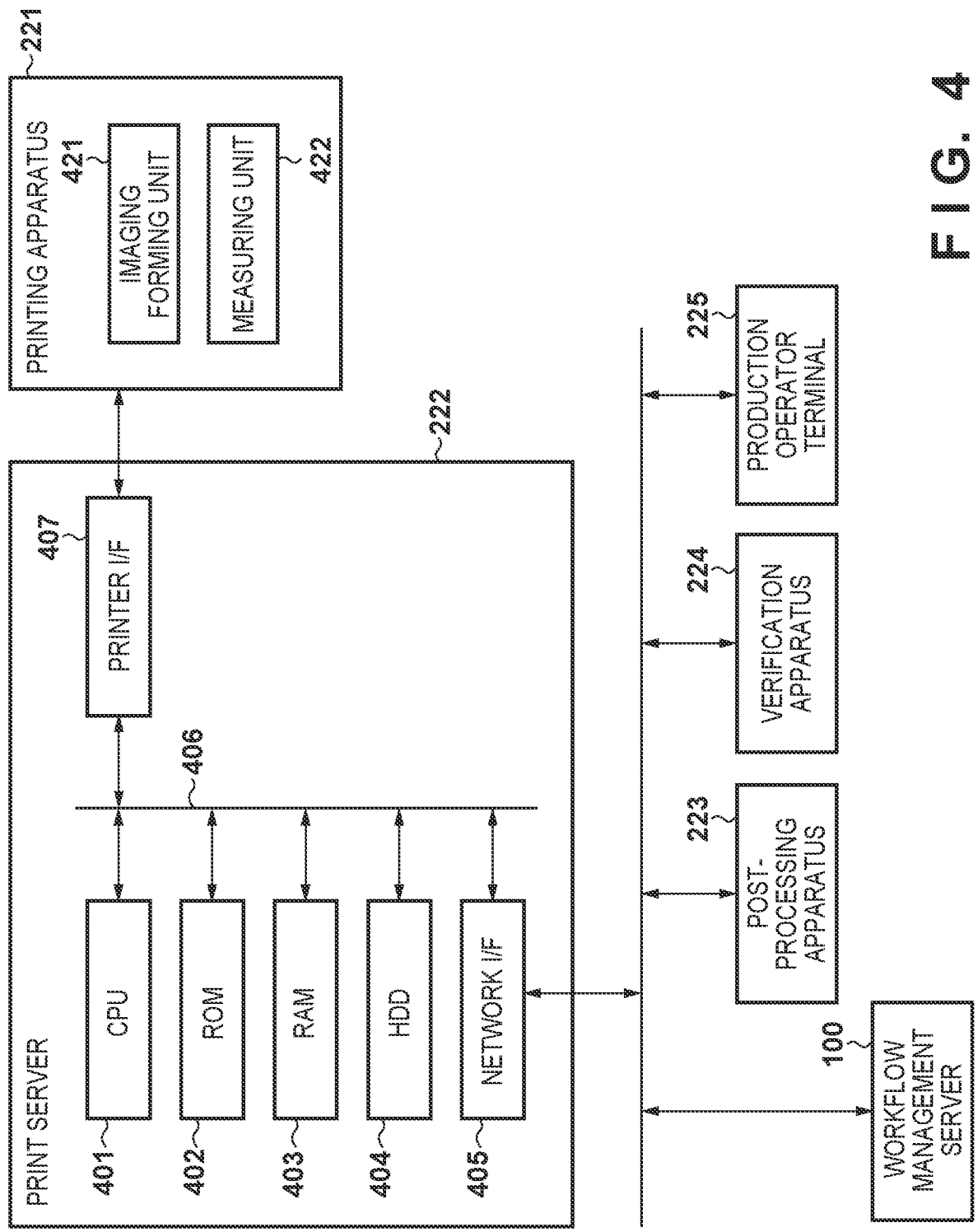
FIG. 4 is a block diagram for describing a hardware configuration of a production system according to embodiments.

FIG. 4 is a block diagram for describing a hardware configuration of the production system 120 according to the embodiments.

A CPU 401 of the print server 222 deploys a control program stored in a ROM 402 or a hard disk (HDD) 404 into a RAM 403, executes the deployed program, and comprehensively controls access of various devices connected to a system bus 406. The ROM 402 stores control programs and the like which the CPU 401 can execute. The RAM 403 is configured to mainly function as a main memory, work area, and the like of the CPU 401, and can have its memory capacity extended by an optional RAM connected to an expansion port (not shown). The hard disk (HDD) 404 stores a boot program, various applications, font data, user files, edit files, and the like. A network I/F 405 performs data communication with other apparatuses via the network. A printer I/F 407 controls output of images to an imaging forming unit 421 of the printing apparatus 221. Also, the printer I/F 407 controls a measuring unit 422 arranged inside the printing apparatus 221 and receives measurement results. The printing apparatus 221 has the imaging forming unit 421 that is responsible for at least a print operation and the later-described measuring unit 422. Also, the configuration may be such that a feeding apparatus (not shown), an inline post-processing apparatus, or the like is connected to the printing apparatus 221.

The imaging forming unit 421 prints (forms) an image on a sheet based on print data. A hardware configuration thereof is the same as the printing apparatus 221 generally. The measuring unit 422, in accordance with an instruction of the print server 222 or the printing apparatus 221, measures the print product that the imaging forming unit 421 generated. The measurement format is a known measurement format such as a spectrophotometric colorimetry, a density measurement, a CCS scan, or a CIS scan. Note that, although the measuring unit 422 is described as being arranged within the printing apparatus 221 in the embodiments, it is not limited to this. In other words, the measuring unit 422 may be connected to the network alone, being independent of the printing apparatus 221. Alternatively, the measuring unit 422 may be connected to an operation terminal (not shown) which can be connected to a network, and thereby connected to the network via the operation terminal. In any case, the printing apparatus 221 connects to the workflow management server 100 via the network, and transmits and receives various information.

Next, a software configuration of various apparatuses according to the embodiment will be described.

Figure 5A:
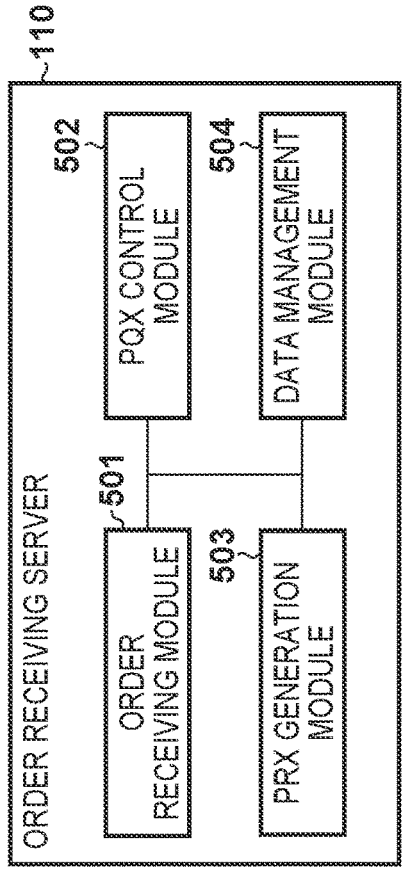
FIG. 5A is a block diagram for describing a software configuration of an order receiving server according to embodiments.

FIG. 5A is a block diagram for describing a software configuration of the order receiving server 110 according to embodiments. These software modules are realized by storing a program in an HDD (not shown), and by a CPU (not shown) deploying this program in a RAM (not shown) and executing the program.

An order receiving module 501 receives order information of a product from the end user terminal 212 via the network. The order information includes information of the product type, inputted image data, quality requirement data, and the like. Note that, although PDF format data is described as input data as an example in the embodiments, the present disclosure is not limited to this. There may be a form in which image data of another general format which can be interpreted by the production system 120 is handled. A PQX control module 502 receives PQX data from the workflow management server 100 and performs a predetermined control. The predetermined control is, for example, recording to a database, processing of converting data into information to be presented to the end user, and the like. A PRX generation module 503 analyzes order information received from the order receiving module 501 and generates PRX data. Also, the generated PRX data is transmitted to the workflow management server 100. A data management module 504 records information such as the order information, the PRX data, and the PQX data. Also, the data management module 504 transmits inputted image data, product type information, and PRX data to the workflow management server 100. Furthermore, the data management module 504 executes additional transmission/reception of data between various apparatuses.

Figure 5B:
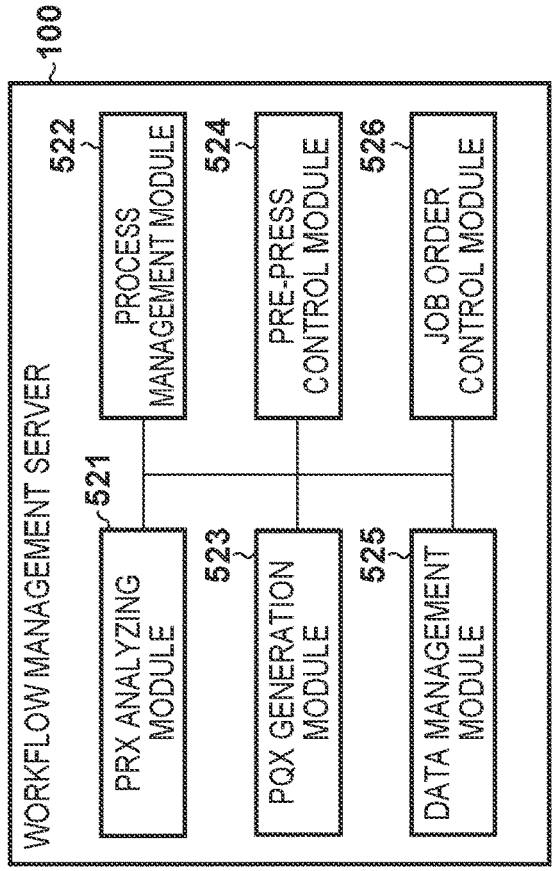
FIG. 5B is a block diagram for describing a software configuration of a workflow management server according to embodiments.

FIG. 5B is a block diagram for describing a software configuration of the workflow management server 100 according to the embodiment. These software modules are realized by storing a program in the HDD 304, and the CPU 301 deploying this program in the RAM 303 and executing the program.

A PRX analyzing module 521 analyzes the PRX data received from the order receiving server 110 and specifies print quality requirements and a portion of the required pre-press processing. For example, a print quality requirement may be whether a mean color difference obtained from the measurement results of predetermined color patches is within a specific standard, or the like. Also, the pre-press processing is, for example, a process of adding color patch images, which are to be a colormetric target in the color quality checking process, to a margin portion of the image data. Also, a calculation of a quality score in a case where the minimum acceptable quality rank of each item defined by the PRX data is satisfied, and the like are performed.

A process management module 522 uses product type information received from the order receiving server 110 and analysis result information of the PRX analyzing module 521 to decide the production system 120 to be used, and issues a command to the pre-press control module 524. There are cases where the product is configured from a plurality of various parts depending of the type of product. In such a case, it is necessary that the process management module 522 generates, from one order, a job in units of parts. Also, the process management module 522 also generates job ticket data which is referenced by each device in the production system 120. Although description is given using data of the known JDF standard as job ticket data in the embodiments, the present disclosure is not limited to this. Configuration may be such that another known job ticket data format that the production system 120 can interpret is used. Also, the process management module 522 generates operation setting information of the post-processing apparatus 223 and the verification apparatus 224 with reference to the quality requirement data. Furthermore, the process management module 522 transmits PDF data, JDF data, and operation setting information of each device after pre-press processing (described later) to the production system 120.

A PQX generation module 523 generates PQX data with reference to various information received from the production system 120 and transmits it to the order receiving server 110. The pre-press control module 524 executes pre-press processing on inputted image data based on the command from the process management module 522 and transmits the processed PDF data to the process management module 522. A data management module 525 transmits the PQX data to the order receiving server 110. Also, the data management module 525 transmits PDF data and JDF data to the production system 120, and instruction information for each device configuring the production system 120. Furthermore, the data management module 525 executes additional transmission/reception of data between various apparatuses. A job order control module 526 decides an execution order of each job based on the results that the PRX analyzing module 521 analyzed, and then controls such that the jobs are executed in the production system 120 in the decided order.

Figure 5C:
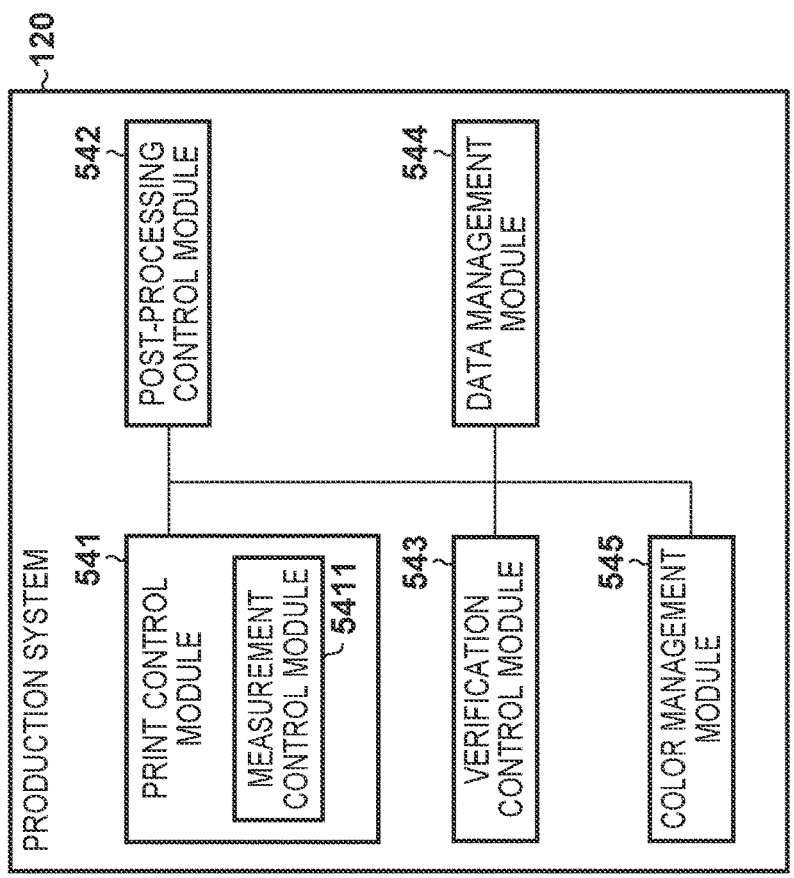
FIG. 5C is a block diagram for describing a software configuration of a production system according to embodiments.

FIG. 5C is a block diagram for describing a software configuration of the production system 120 according to the embodiment. In each of the various devices which configure the production system 120, these software modules are realized by storing a program in an HDD, and a CPU deploying the program to a RAM and executing the program. Note, although the production system 120 includes the printing apparatus 221, the print server 222, the post-processing apparatus 223, and the verification apparatus 224, these four pieces of hardware will be considered and described as one piece of hardware called the production system 120 in the present embodiment.

A print control module 541 executes print control by using the information (PDF and JDF) received from the workflow management server 100. Also, the print control module 541 includes an adjustment function for adjusting print quality, and executes the adjustment function in accordance with a control instruction received from any one of the workflow management server 100, the print server 222, and the production operator terminal 225. Also, the print control module 541 includes a measurement control module 5411. The measurement control module 5411 executes control of a measurement by the measuring unit 422 in accordance with a control instruction received from any one of the workflow management server 100, the print server 222, and the operator terminal 225. A post-processing control module 542 executes post-processing control in accordance with a control instruction received from the workflow management server 100.

A verification control module 543 executes control of verification by the verification apparatus 224 in accordance with a control instruction received from the workflow management server 100. The verification control module 543 compares image data read by a sensor within the verification apparatus 224 with standard image data. As a result of this comparison, in a case where a difference exceeding a predetermined acceptable range is detected, the verification target is specified as a defect, and a predetermined control such as a notification to the user is performed, for example.

A data management module 544 transmits information such as control results of the various devices of the production system 120 to the workflow management server 100. Furthermore, the data management module 544 executes additional data transmission/reception between various apparatuses. Note, the data management module 544 may be provided individually in each device. A color management module 545 manages color quality of a print product according to the printing apparatus 221 and the print server 222. Specifically, control of known color adjustment process and color quality checking process is performed.

Next, an overview of PRX data generated by the order receiving server 110 is described.

FIGS. 6A-6C depicts views respectively illustrating concrete examples of PRX data according to the embodiments.

As exemplified in FIGS. 6A-6C, the PRX data includes a request for quality such as "EvaluationInfo" and "Quality Specification". "QualityGoals" is configured from fields including a quality specification and an evaluation standard for color, registration, or a barcode or the like. "Color" indicates a score calculation method of a color, a score standard, and the like. "MinimumAcceptableRank" indicates an acceptable minimum quality rank. Note, although in the embodiment description is given of a configuration in which only a part of "QualityGoals" is used, the present disclosure is not limited to this and configuration may be taken such that other fields of the PRX data be used.

First example of "QualityGoals" is an inspection of a color fluctuation according to the print control module 541. As described above, the print control module 541 includes the measurement control module 5411 and can monitor color fluctuation of the production system 120 during production. "JapanColor" is one example of a print color standard. The production system 120, which satisfies this standard, can certify that the quality of a print product is greater than or equal to a certain amount. In embodiments, a color fluctuation inspection is performed by checking whether or not each job satisfies the JapanColor standard. The color fluctuation is inspected by an average value of a color difference ΔE00 (CIE DE2000) between the colorimetric value of print products produced by the production system 120 and a predetermined JapanColor value. In such a case, an example of a parameter description of "Color" is described.

In "ComplianceGoal", "JapanColor dE (CIE DE2000)", which is a formula for score calculation, is described. "MinimumAcceptableRank" describes an acceptable minimum quality rank. In the example of reference numeral 601 of FIG. 6A, "5" is defined as a minimum quality rank. In "ColorScoringScale", the quality rank in the PRX data for the score obtained according to the score calculation formula is described. The quality rank in the PRX data denotes that the higher the numerical value, the higher the quality. In the example of the reference numeral 601 of FIG. 6A, when the calculation result of dE (CIE DE2000) is "2 or less", the rank is defined as "7". Also, when the calculation result is "greater than 2 and less than or equal to 3", the rank is defined as "6". Additionally, when the calculation result is "greater than 3 and less than or equal to 5", the rank is defined as "5". Furthermore, the PRX data can be set for each job. As shown by reference numerals 601, 602, and 603 in FIGS. 6A-6C, configuration may be such that the items are the same, and only respective parameters are different, and the items to be described themselves may be changed. By this, it becomes possible for each module that received PRX data to interpret the quality requirement for printing of each job, and processing that accords to the quality requirement becomes possible.

First Embodiment

Based on the above described assumption, description is given regarding a first embodiment of the present disclosure hereinafter. In the first embodiment, an example is described in which the total value of the quality scores of the received jobs is calculated, and each job is executed in the order from the job having the largest total value down.

FIG. 7 is a flowchart for describing the flow of processing by the workflow management server 100 according to the first embodiment. Note, description is made assuming that the PRX data includes a description of quality requirements regarding "color" and "registration" in the first embodiment. Also, the processing shown in the flowchart is realized by the CPU 301 of the workflow management server 100 deploying a control program stored in the ROM 302 to the RAM 303 and executing the deployed program.

Firstly, the CPU 301 in step S701 functions as the data management module 525, obtains information of a job for which printing has been scheduled, and transfers the information to the PRX analyzing module 521. The CPU 301 in step S702 functions as the PRX analyzing module 521, analyzes the PRX data provided for the job, and calculates a quality score of the job in a case where an acceptable minimum quality rank is satisfied for each item set in the PRX data. Then, the processing advances to step S703, and the CPU 301 functions as the data management module 525, determines whether or not calculation of a respective quality score of all jobs scheduled for printing has ended, returns the processing to step S701 in a case where it has not ended for all jobs, obtains information of the next job, and performs calculation of the quality score of the next job similarly to what is described above. Meanwhile, in a case where the calculation of the respective quality score of all jobs has ended, the processing advances to step S704. The CPU 301 in step S704 functions as the job order control module 526, compares the quality score of each job calculated in step S702, and sets an execution sequence of jobs in order of largest score down. Note that here, the calculation of the quality score of each job in step S703 is performed based on "ColorScore+RegistrationScore" defined in "BasisofCalculation" of "EvaluationInfo" in the reference numeral 601 of FIG. 6A, for example.

Hereinafter, concrete examples are described by using the PRX data described in FIGS. 6A-6C.

In the PRX data described in the reference numeral 601 of FIG. 6A, MinimumAcceptableRank of Color is set to "5" and MinumumAcceptableRank of Registration is set to "6". Also, in "BasisofCalculation" for calculating the quality score of a job, "ColorScore+RegistrationScore" is set as the evaluation formula. Accordingly, in the PRX data described in reference numeral 601 of FIG. 6A from this information, the quality score is set to "11" from the result of adding the "5" of Color and the "6" of Registration.

Meanwhile, in the PRX data described in the reference numeral 602 of FIG. 6B, MinimumAcceptableRank of Color is set to "6" and MinimumAcceptableRank of Registration is set to "7". Also, because "BasisofCalculation" is the same as the PRX data described in the reference numeral 601 of FIG. 6A, the quality score is calculated as 6+7=13. Similarly, the quality score calculated from the PRX data described in the reference numeral 603 of FIG. 6C becomes "15". Accordingly, in a case where there are a plurality of print jobs provided by the PRX data described in FIGS. 6A-6C, the job to which the PRX data described in FIG. 6C, which has the highest quality score, is attached is executed first. Next, the job to which the PRX data described in FIG. 6B is attached is executed. Then, the job to which the PRX data described in FIG. 6A, which has the lowest quality level, is attached is executed last.

According to the first embodiment as described above, by executing in order of each job with the highest quality requirements requested by the PRX data down, the production system is adjusted to match with the job having highest quality requirements before the first job is executed. By this, when executing a subsequent job whose quality requirements are lower than that of the first job, the time required for the adjustment can be shortened, and therefore it becomes possible to reduce downtime for adjustment that occurs in a subsequent job.

Second Embodiment

Next, with reference to FIG. 8, description is given regarding a second embodiment of the present disclosure. In the second embodiment, an example is described in which the quality score of each received job is calculated, the quality scores of the jobs that use the same kind of sheet for printing are compared, and the jobs are executed in order of the job having the largest quality score down, where the same kind of sheet is used.

FIG. 8 is a flowchart for describing a flow of processing by the workflow management server 100 according to the second embodiment. Note, description is made assuming that the PRX data includes a description of quality requirements regarding "color" and "registration" in the second embodiment. Also, the processing shown in the flowchart is realized by the CPU 301 of the workflow management server 100 deploying a control program stored in the ROM 302 to the RAM 303 and executing the deployed program. Note, in FIG. 8, because the processing of steps S801 to S803 is the same as that of steps S701 to S703 of FIG. 7 of the previously described first embodiment, description thereof is omitted.

In step S804, the CPU 301 functions as the job order control module 526, compares the quality scores of each job calculated in step S802 between jobs that use the same type of sheet, and determines the execution order of the jobs in the order of the highest quality score down.

By virtue of the second embodiment as described above, a job with the highest print requirements requested in the PRX data is printed first. Also, this process is performed between jobs in which the sheets used in the jobs are of the same type. By this, the production system will be adjusted to match with the job having the highest quality requirements before printing the first job. Specifically, because various adjustments of the production system are often associated with each type of sheet, the job with the highest requested quality, from among jobs using the same type of sheet, is to be executed first in the print order. Also, when executing a subsequent job whose quality requirement is lower than that of the first job, the time required for the adjustment can be shortened so that it becomes possible to further enhance the effect of reducing the downtime for adjustment that occurs in the subsequent job.

Third Embodiment

Figure 9:
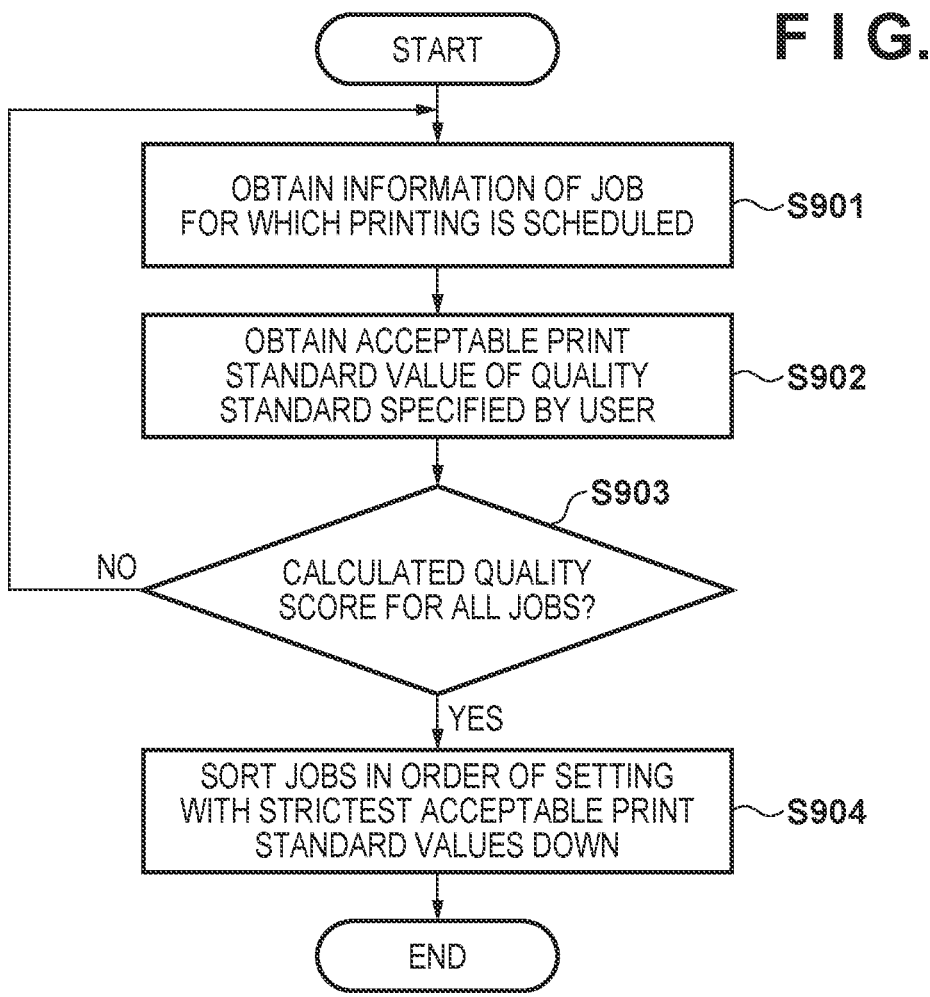
FIG. 9 is a flowchart for describing a flow of a process by the workflow management server according to a third embodiment.
Figure 10:
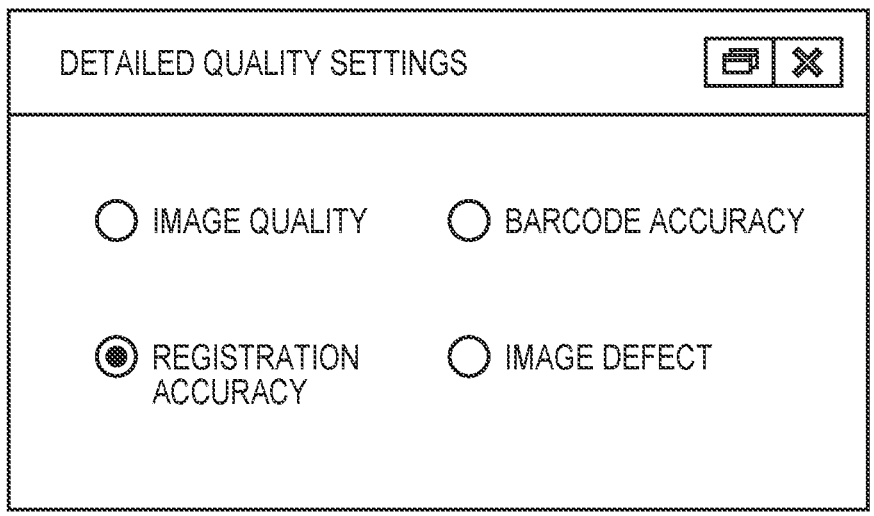
FIG. 10 depicts a view illustrating one example of a UI for setting quality items viewed as important by a user in the third embodiment.

Next, with reference to FIG. 9 and FIG. 10, description is given regarding a third embodiment of the present disclosure. As in the same in the third embodiment, the printing is performed in order of the job having the highest print requirements requested in the PRX data down, but unlike in the previously described embodiments, jobs are executed in order of the job having the highest quality item specified by the user down.

FIG. 9 is a flowchart for describing the flow of processing by the workflow management server 100 according to the third embodiment. Note, description is made assuming that that PRX has a description of quality requirements regarding "color" and "registration" in the third embodiment. Also, the processing shown in the flowchart is realized by the CPU 301 of the workflow management server 100 deploying a control program stored in the ROM 302 to the RAM 303 and executing the deployed program.

FIG. 10 depicts a view illustrating one example of a UI for setting a quality item that the user will focus on in the third embodiment.

Since the processing of step S901 of FIG. 9 is the same as the processing of step S701 of FIG. 7 of the previously described first embodiment, description thereof is omitted. In step S902, the CPU 301 functions as the PRX analyzing module 521 and obtains a quality requirement relating to a quality item set by the user from among the job information obtained in step S901.

The user, in advance, uses the UI as illustrated in FIG. 10, for example, or the like to set the quality item to be used for sorting. In the example of FIG. 10, "registration accuracy" is set. In such a case, the quality requirement relating to the registration accuracy is obtained from the PRX data in step S902.

Then, in step S903, the CPU 301, similarly to previously described step S703, functioning as the data management module 525, determines whether or not calculation of the quality scores of all jobs scheduled for printing has ended, returns the processing to step S901 in a case where the calculation has not ended for all jobs, and obtains information of the next job. Meanwhile, in a case where the calculation of the respective quality score for all jobs has ended, the processing advances to step S904. In step S904, the CPU 301 functions as the job order control module 526, and decides the job execution order in the order of the strictest quality standard corresponding to the quality item designated by the user obtained in step S902 down.

Concrete examples are described by using the PRX data described in FIGS. 6A-6C regarding the third embodiment.

An example is described in which the user selects "registration accuracy" on the UI screen of FIG. 10 in advance. In the PRX data described in the reference numeral 601 of FIG. 6A, "6" is obtained for MinimumAcceptableRank of Registration, "7" is obtained in the PRX data of the reference numeral 602 of FIG. 6B, and "8" is obtained in the PRX data of the reference numeral 603 of FIG. 6C, and these are compared. As a result, the job to which the PRX data having the strictest MinimumAcceptableRank shown in the reference numeral 603 of FIG. 6C is attached is executed first, and next, the job to which the PRX data of the reference numeral 602 of FIG. 6B is attached is executed. Finally, the job to which the PRX data of the reference numeral 601 of FIG. 6A having the lowest MinimumAcceptableRank is attached is executed.

As described above, by virtue of the third embodiment, the user can set the job replacement order based on a quality item specified in advance. As a result, the user can set an item for which downtime due to an adjustment is most desired to be reduced, and the convenience of the user is improved.

Note, by adding the configuration of the previously described second embodiment to the third embodiment, configuration may also be taken such that the job replacement order is set based on a quality item that the user specified from among print jobs that use the same sheet type.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-207355, filed Nov. 15, 2019, which is hereby incorporated by reference herein in its entirety.

What is claimed is:

1. An information processing apparatus comprising:
a receiver that receives a first print job, first quality requirement data indicating a first quality required about a first print product to be output by executing the first print job, a second print job and second quality requirement data indicating a second quality required about a second print product to be output by executing the second print job; and
a controller that determines an execution order of the first print job and the second print job based on the first quality requirement data and the second quality requirement data so that a print job having higher quality requirement data is earlier executed than a print job having lower quality requirement data in the determined execution order,
wherein the controller instructs a printing apparatus to execute, in accordance with the determined execution order, the first print job and the second print job.

2. The information processing apparatus according to claim 1, wherein the controller obtains a first score of the first quality for the first print job and a second score of the second quality for the second job based on an evaluation formula and determines the execution order of the first print job and the second print job.

3. The information processing apparatus according to claim 1, wherein the controller obtains scores of qualities for print jobs which includes the first print job and the second print job and in which the same type of sheet is used are obtained based on an evaluation formula, and determines the execution order of the respective print jobs.

4. The information processing apparatus according to claim 1, wherein the controller specifies, among quality items, a quality item that a user intends to focus on, and
wherein the controller obtains scores corresponding to the quality item specified by the controller among the quality requirement data attached to the print jobs including the first print job and the second print job, and determines the execution order of the respective print jobs.

5. The information processing apparatus according to claim 1, wherein the information processing apparatus receives a result of checking whether the required first quality and the required second quality are satisfied and outputs the result as a print quality report.

6. The information processing apparatus according to claim 5, wherein the print quality report is PQX (Print Quality eXchange format) data.

7. The information processing apparatus according to claim 1, wherein the first quality requirement data is PRX (Print Requirement eXchange format) data, and
wherein the second quality requirement data is PRX data.

8. A method of controlling an information processing apparatus, the method comprising:
receiving a first print job, first quality requirement data indicating a first quality required about a first print product to be output by executing the first print job, a second print job and second quality requirement data indicating a second quality required about a second print product to be output by executing the second print job;

determining an execution order of the first print job and the second print job based on the first quality requirement data and the second quality requirement data so that a print job having higher quality requirement data is earlier executed than a print job having lower quality requirement data in the determined execution order; and instructing a printing apparatus to execute, in accordance with the determined execution order, the first print job and the second print job.

9. A non-transitory computer-readable storage medium storing a program for causing a processor to execute a method of controlling an information processing apparatus, the method comprising:

receiving a first print job, first quality requirement data indicating a first quality required about a first print product to be output by executing the first print job, a second print job and second quality requirement data indicating a second quality required about a second print product to be output by executing the second print job;

determining an execution order of the first print job and the second print job based on the first quality requirement data and the second quality requirement data so that a print job having higher quality requirement data is earlier executed than a print job having lower quality requirement data in the determined execution order; and instructing a printing apparatus to execute, in accordance with the determined execution order, the first print job and the second print job.

10. The information processing apparatus according to claim 2, wherein the evaluation formula is described in the first quality requirement data and the second quality requirement data.

11. A printing system comprising:

a receiver that receives a first print job, first quality requirement data indicating a first quality required about a first print product to be output by executing the first print job, a second print job and second quality requirement data indicating a second quality required about a second print product to be output by executing the second print job; and a controller that determines an execution order of the first print job and the second print job based on the first quality requirement data and the second quality requirement data so that a print job having higher quality requirement data is earlier executed than a print job having lower quality requirement data in the determined execution order, wherein the printing system executes, in accordance with the determined execution order, the first print job and the second print job.

* * * * *